(12) United States Patent
Oka et al.

(10) Patent No.: US 8,879,499 B2
(45) Date of Patent: *Nov. 4, 2014

(54) RADIO COMMUNICATION TERMINAL

(75) Inventors: Shinya Oka, Yokosuka (JP); Takashi Okada, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 189 days.

This patent is subject to a terminal disclaimer.

(21) Appl. No.: 13/512,397

(22) PCT Filed: Nov. 24, 2010

(86) PCT No.: PCT/JP2010/070913
§ 371 (c)(1),
(2), (4) Date: May 29, 2012

(87) PCT Pub. No.: WO2011/068063
PCT Pub. Date: Jun. 9, 2011

(65) Prior Publication Data
US 2012/0230228 A1 Sep. 13, 2012

(30) Foreign Application Priority Data
Dec. 3, 2009 (JP) ................................ 2009-275407

(51) Int. Cl.
*H04W 4/00* (2009.01)
*H04B 1/04* (2006.01)
*H04B 1/00* (2006.01)

(52) U.S. Cl.
CPC ............ *H04B 1/0483* (2013.01); *H04B 1/0067* (2013.01); *H04B 1/0057* (2013.01)
USPC ........................................................ 370/330

(58) Field of Classification Search
None
See application file for complete search history.

(56) References Cited

U.S. PATENT DOCUMENTS

2001/0051507 A1* 12/2001 Ichihara ........................ 455/86
2002/0064237 A1* 5/2002 Shibata ......................... 375/302

(Continued)

FOREIGN PATENT DOCUMENTS

| JP | 2000 517496 | 12/2000 |
| JP | 2007 274465 | 10/2007 |

OTHER PUBLICATIONS

3GPP TR 36.807 V0.1.0 R4-103431, "3$^{rd}$ Generation Partnership Project; Technical Specification Group Radio Access Network; Evolved Universal Terrestrial Radio Access (E-UTRA); User Equipment (UE) radio transmission and reception," pp. 1-94, (Aug. 2010).

(Continued)

*Primary Examiner* — Anh-Vu Ly
*Assistant Examiner* — Gustavo Lopez-Vargas
(74) *Attorney, Agent, or Firm* — Oblon, Spivak, McClelland, Maier & Neustadt, L.L.P.

(57) ABSTRACT

A mobile communication terminal (100) has a path (T1) that supplies first and second upward link modulated transmission signals from a modulator-demodulator circuit (200) via a transmission filter (110A) to an adder (150), and a path (T2) that supplies signals via transmission filter (110B) to adder (150) depending on frequencies of signals. The adder (150) adds transmission signals supplied from the path (T1) and from the path (T2) and simultaneously sends them out via a transmitting and receiving antenna (101). The mobile communication terminal (100) supplies first and second forward link modulated reception signals received by transmitting and receiving antenna (101) via a reception filter (120) to the modulator-demodulator circuit (200).

2 Claims, 5 Drawing Sheets

(56) References Cited

U.S. PATENT DOCUMENTS

| | | | |
|---|---|---|---|
| 2003/0142622 A1* | 7/2003 | Kaku et al. | 370/208 |
| 2006/0193375 A1* | 8/2006 | Lee | 375/219 |
| 2007/0069820 A1* | 3/2007 | Hayata et al. | 330/298 |
| 2007/0103248 A1* | 5/2007 | Nakamura et al. | 331/167 |
| 2008/0233878 A1* | 9/2008 | Iizuka et al. | 455/42 |
| 2011/0003565 A1* | 1/2011 | Chun | 455/115.3 |
| 2012/0231751 A1* | 9/2012 | Oka et al. | 455/78 |
| 2013/0156141 A1* | 6/2013 | Eo et al. | 375/346 |

OTHER PUBLICATIONS

International Search Report Issued Dec. 21, 2010 in PCT/JP10/70913 Filed Nov. 24, 2010.

* cited by examiner

RADIO COMMUNICATION TERMINAL

TECHNICAL FIELD

The present invention relates to a radio communication terminal that transmits data over plural frequency bands and receives data over plural frequency bands.

BACKGROUND ART

A data communication service using third-generation mobile communication (IMT-2000: International Mobile Telecommunications-2000) is widespread. As demand for ultra-high-speed large-capacity communication is rapidly increasing, the WRC (World Radiocommunication Conference) of the ITU (International Telecommunication Union) decided on frequency bands for IMT, including for the third-generation and the fourth-generation portable phones, in 2007.

Depending on the results of future discussions at the ITU and 3GPP (Third Generation Partnership Project), a radio station could be required to be compatible with different frequency bandwidths differing depending on country and region. For example, a 400-MHz bandwidth partitioning and an 800-MHz bandwidth partitioning are being discussed as a bandwidth partitioning for LTE-Advanced (Long Term Evolution-Advanced), for which standardization is in progress for the fourth generation portable phone standard, IMT-Advanced.

FIG. 1 shows an example of a 400 MHz-width bandwidth partitioning and an 800 MHz-width bandwidth partitioning. In this example of partitioning, as shown in FIG. 1, in a case in which the 400 MHz-width bandwidth has been allocated, [f0] to [f0+120] MHz (first upward band) is used as an upward link frequency band, and [f0+160] to [f0+400] MHz (first forward band) is used as a forward link frequency band. In a case in which the 800 MHz-width bandwidth has been allocated, a turned back bandwidth partitioning in which the partitioning of [f0] to [f0+400] MHz is the same as that for the 400 MHz-width bandwidth and in which the upward link frequency band and the forward link frequency band are inversely located for [f0+400] to [f0+800] MHz can be conceived, considering spectral efficiency. Specifically, [f0] to [f0+120] MHz (first upward band) and [f0+680] to [f0+800] MHz (second upward band) are used as the upward link frequency band, and [f0+160] to [f0+400] MHz (first forward band) and [f0+400] to [f0+640] MHz (second forward band) are used as the forward link frequency band.

In the LTE-Advanced, discussion is continuing regarding utilizing a technique called a carrier aggregation in which plural upward link modulated transmission signals are aggregated so that a large amount of data is simultaneously transmitted at high speeds and in which plural forward modulated reception signals are aggregated so that a large amount of data is simultaneously received. In this case, a radio communication terminal simultaneously processes plural upward link modulated transmission signals and simultaneously processes simultaneously received plural forward modulated reception signals.

CITATION LIST

Patent Document

Patent Document 1: Published Japanese Translation No. 2000-517496 of the PCT International Publication

SUMMARY OF INVENTION

Technical Problem

We can assume a configuration of a radio communication terminal, such as is shown in FIG. 2, capable of simultaneously transmitting plural upward link modulated transmission signals and simultaneously receiving plural forward modulated reception signals in the bandwidth partitioning of an 800-MHz bandwidth, such as, for example, shown in FIG. 1.

As shown in the figure, this mobile station has a duplexer 3 for a first upward link modulated transmission signal modulated by a frequency belonging to the above first upward band and for a first forward link modulated reception signal modulated by a frequency belonging to the above first forward band and a duplexer 4 for a second upward link modulated transmission signal modulated by a frequency belonging to the above second upward band and a second forward link modulated reception signal modulated by a frequency belonging to the above second forward band. Each duplexer 3,4 has a transmission bandpass filter and a reception bandpass filter. The radio communication terminal additionally comprises a modulator-demodulator circuit 7 having two sets of modulation circuits 71,73 each capable of generating first and second upward link modulated transmission signals, respectively, and two sets of demodulation circuits 72,74 each capable of demodulating first and second forward link modulated reception signals, respectively. In this configuration, a first upward link modulated transmission signal generated at modulation circuit 71 is supplied via a power amplifier 5 and duplexer 3 to an adder 2. A second upward link modulated transmission signal generated at modulation circuit 73 is supplied via a power amplifier 6 and duplexer 4 to adder 2. The first and second upward link modulated transmission signals are combined at adder 2 and are simultaneously transmitted via a transmitting and receiving antenna 1. Additionally, first and second forward link modulated reception signals simultaneously received at transmitting and receiving antenna 1 respectively pass through duplexer 3 and 4 and are demodulated at each demodulation circuit 72,74. Thus, a duplexer (i.e., a pair of a transmission bandpass filter and a reception bandpass filter) is required for each of the different bands. Therefore, the circuit area of the radio communication unit increases in comparison with a radio station that is compatible with only one radio communication network.

As a conventional radio station, Patent Document 1 discloses in FIG. 4 thereof a technique for providing two filters in a transmitter device that are switched depending on a network to communicate with and also providing two filters in a receiver device that are switched depending on a network. In this case, because a pair of a transmission bandpass filter and a reception bandpass filter is required for each network, the circuit area of the radio communication unit increases in comparison with a radio station that is compatible with only one radio communication network.

The present invention has, as an object, to provide a radio communication terminal compatible with two different radio communication networks for each of which an upward link frequency band and a forward link frequency band are different, the radio communication terminal being capable of simultaneously transmitting plural upward link modulated transmission signals, and capable of simultaneously receiving plural forward link modulated reception signals, while minimizing increase in the circuit area.

Solution to Problem

A radio communication terminal of the present invention has: a modulation unit for generating a first upward link modulated transmission signal transmitted by a first upward link frequency belonging to a first upward band used for upward link communication in both of a first radio communication network and a second radio communication network, and for generating a second upward link modulated transmission signal transmitted by a second upward link frequency belonging to a second upward band used for upward link communication in said second radio communication network; a first transmission bandpass filter that passes a frequency component belonging to said first upward band; a second transmission bandpass filter that passes a frequency component belonging to said second upward band; a duplexer that passes a frequency component belonging to said first upward band so that said first upward link modulated transmission signal passes through said first transmission bandpass filter, and that passes a frequency component belonging to said second upward band so that said second upward link modulated transmission signal passes through said second transmission bandpass filter; a combiner that combines said first upward link modulated transmission signal that has passed through said first transmission bandpass filter and said second upward link modulated transmission signal that has passed through said second transmission bandpass filter; a transmitter antenna that simultaneously transmits said first upward link modulated transmission signal and said second upward link modulated transmission signal; a receiver antenna that simultaneously receives a first forward link modulated reception signal modulated by a first forward link frequency belonging to a first forward band used in forward link communication in both the first radio communication network and the second radio communication network and a second forward link modulated reception signal modulated by a second forward link frequency belonging to a second forward band used for forward link communication in said second radio communication network, said first forward band and said second forward band being contiguous; a reception bandpass filter that passes a frequency component belonging to said first forward band and a frequency component belonging to said second forward band from the receiver antenna; and a demodulation unit for generating a first reception signal by demodulating said first forward link modulated reception signal that has passed through said reception bandpass filter and for generating a second reception signal by demodulating said second forward link modulated reception signal that has passed through said reception bandpass filter.

In the present invention, a forward link frequency band used has a first forward band overlapping for the first and the second radio communication networks and has a second forward band that is a forward link frequency band used only by the second radio communication network, and the first forward band and the second forward band are arranged contiguously. The present invention has a single reception bandpass filter for both frequency bands used for forward link for communication in the first and second radio communication networks. According to the present invention, the circuit area in a radio receiver is reduced in comparison with a case in which separate reception bandpass filters are provided for first and second forward link modulated reception signals transmitted in forward link communication in two radio communication networks for which forward link frequency band bandwidths are different. Therefore, while suppressing the circuit area, it is possible to respond to receiving a signal from two radio communication networks for which forward link frequency bands are different from each other.

In the present invention, an upward link frequency band used has a first upward band overlapping for the first and the second radio communication networks and has a second upward band that is an upward link frequency band used only by the second radio communication network. The present invention has a first transmission bandpass filter that passes a signal transmitted by a frequency belonging to the first upward band and a second transmission bandpass filter that passes a signal transmitted by a frequency belonging to the second upward band. Thus, a common transmission bandpass filter is provided for the overlapping first upward band, and a separate transmission bandpass filter is provided for a non-overlapping second upward band. According to this configuration, a signal can be transmitted in the upward link in two radio communication networks for which upward link frequency bands are different from each other.

Furthermore, in the present invention, a reception bandpass filter that is a wide band and is common for the first forward band and the second forward band is provided. Therefore, in a case in which plural forward link modulated reception signals are simultaneously received with contiguous frequencies, these plural reception signals can be processed with the single reception bandpass filter. Additionally, because the present invention has a transmission bandpass filter for each of the first upward band and the second upward band that are separate from each other and has a combiner that combines signals from respective transmission bandpass filters, it is possible to simultaneously transmit upward link modulated transmission signals generated with remote frequencies. Accordingly, the carrier aggregation can be utilized. That is, a large amount of data can be transmitted or received at high speeds.

According to the radio communication terminal of the present invention, while suppressing the increase in the circuit area of a radio communication unit, it is possible to correspond to two radio communication networks, for each of which the upward link frequency band and the forward link frequency band are different, to simultaneously transmit plural upward link modulated transmission signals and to simultaneously receive plural forward modulated reception signals.

DESCRIPTION OF EMBODIMENTS

In the following, description will be given of an embodiment of the present invention.

Figure 1:
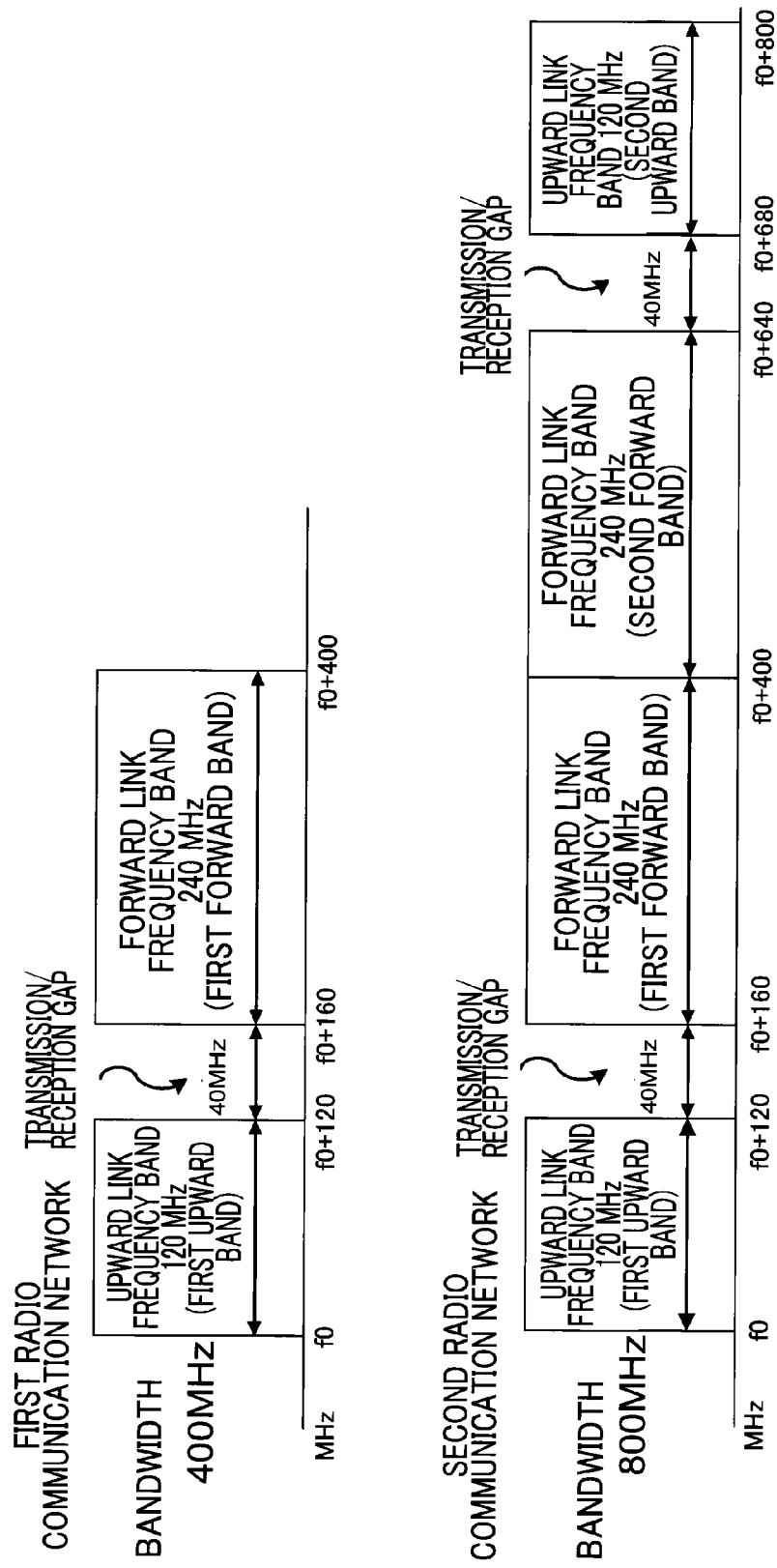
FIG. 1 shows an example of a bandwidth partitioning of frequency bands used in each of a first radio communication network and a second radio communication network.

FIG. 1 is a graph showing an example of a bandwidth partitioning of frequency bands used for a first radio communication network and a second radio communication network.

According to the present embodiment, we assume that the first radio communication network uses a 400 MHz-width frequency band of frequencies from [f0] to [f0+400] MHz, and the second radio communication network uses an 800 MHz-width frequency band of frequencies from [f0] to [f0+

800] MHz. The first and second radio communication networks each provide a speech and data communication service for a later-described mobile communication terminal 100 (radio communication terminal) respectively in first and second countries or regions. Communication in each network is performed in accordance with an OFDMA system (Orthogonal Frequency Division Multiple Access system) for the forward link and in accordance with an SC-FDMA system (Single Carrier Frequency Division Multiple Access system) for the upward link.

As shown in FIG. 1, in the first radio communication network, from among frequencies in an allocated frequency band of 400 MHz, a 120-MHz width of frequencies from [f0] to [f0+120] MHz is used as an upward link frequency band (first upward band), and a 240-MHz width of frequencies from [f0+160] to [f0+400] MHz is used as a forward link frequency band (first forward band). A 40-MHz width of frequencies between [f0+120] and [f0+400] MHz is a transmission and reception gap (guard band). In the second radio communication network, from among frequencies in an allocated frequency band of 800 MHz, the same bandwidth partitioning as the first radio communication network is used for a lower half portion (frequencies from [f0] to [f0+400] MHz). That is, a 120-MHz width of frequencies from [f0] to [f0+120] MHz is used as an upward link frequency band (first upward band), and a 240-MHz width of frequencies from [f0+160] to [f0+400] MHz as a forward link frequency band (first forward band). As for the upper half portion (frequencies from [f0+400] to [f0+800] MHz) of the allocated frequency band, the upward link frequency band and the forward link frequency band are reversed. Specifically, a 120-MHz width of frequencies from [f0+680] to [f0+800] MHz is used as an upward link frequency band (second upward band), and a 240-MHz width of frequencies from [f0+400] to [f0+640] MHz as a forward link frequency band (second forward band). A 40-MHz width of frequencies between [f0+640] and [f0+680] MHz is used as a transmission and reception gap.

In the bandwidth partitioning for the second radio communication network, a transmission and reception gap between the first forward band and the second upward band needs to be provided, if, supposedly, the first upward band, the first forward band, the second upward band, and the second forward band are allocated in ascending order. On the other hand, with the above-described bandwidth partitioning, because the first upward band, the first forward band, the second forward band, and the second upward band are arranged in the listed order, no transmission and reception gap between the first forward band and the second forward band is necessary. That is, the first forward band and the second forward band can be contiguously applied. Therefore, the use efficiency of the frequency band is high.

Figure 3:
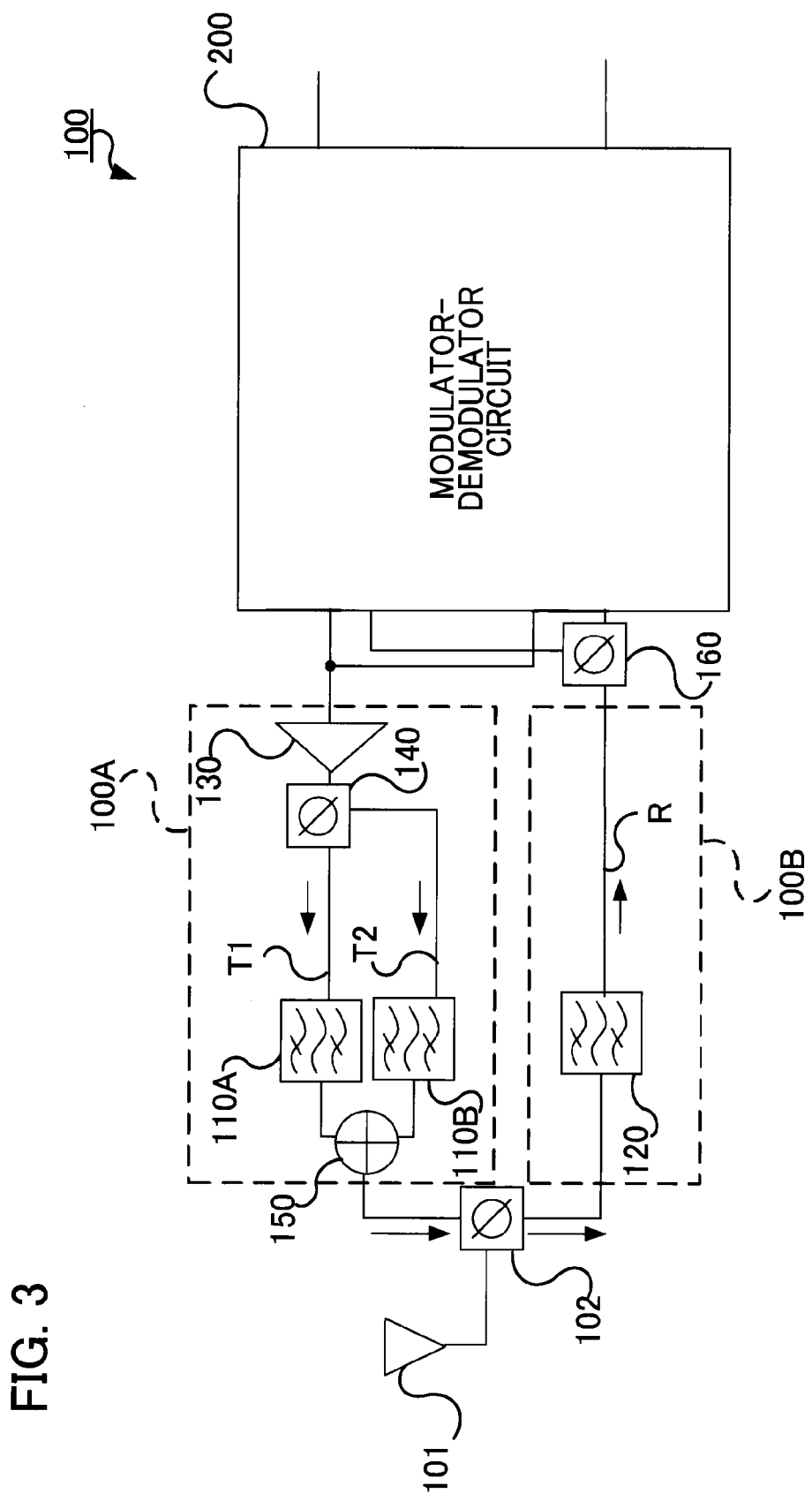
FIG. 3 is a block diagram showing a configuration of a mobile communication terminal according to an embodiment of the present invention.

FIG. 3 is a block diagram showing a configuration of a mobile communication terminal 100 according to the present embodiment. As shown in FIG. 3, mobile communication terminal 100 has a transmitting and receiving antenna 101, a duplexer 102, a modulator-demodulator circuit 200, a radio transmitter 100A that processes an upward link modulated transmission signal generated by modulator-demodulator circuit 200 for supply to duplexer 102, and a radio receiver 100B that processes a forward link modulated reception signal from duplexer 102 for supply to modulator-demodulator circuit 200.

Transmitting and receiving antenna 101 is capable of wirelessly transmitting plural upward link modulated transmission signals (a first upward link modulated transmission signal or a second upward link modulated transmission signal) simultaneously, and of wirelessly receiving plural forward link modulated reception signals (a first forward link modulated reception signal or a second forward link modulated reception signal) simultaneously. Duplexer 102 has a transmission bandpass filter and a reception bandpass filter, and separates transmission waves and reception waves depending on a frequency of a signal input from transmitting and receiving antenna 101 or radio transmitter 100A. The transmission bandpass filter has a passband corresponding to a transmission frequency and a rejectband corresponding to a reception frequency. The reception bandpass filter has a passband corresponding to a reception frequency and a rejectband corresponding to a transmission frequency.

In other words, duplexer 102 is capable of separating an input upward link modulated transmission signal and an input forward link modulated reception signal from each other and supplying the upward link modulated transmission signal to transmitting and receiving antenna 101 and the forward link modulated reception signal to radio receiver 100B. Modulator-demodulator circuit 200 is capable of modulating an upward link transmission signal to generate a first or second upward link modulated transmission signal and of demodulating a first or second forward link modulated reception signal to generate a reception signal.

Figure 4:
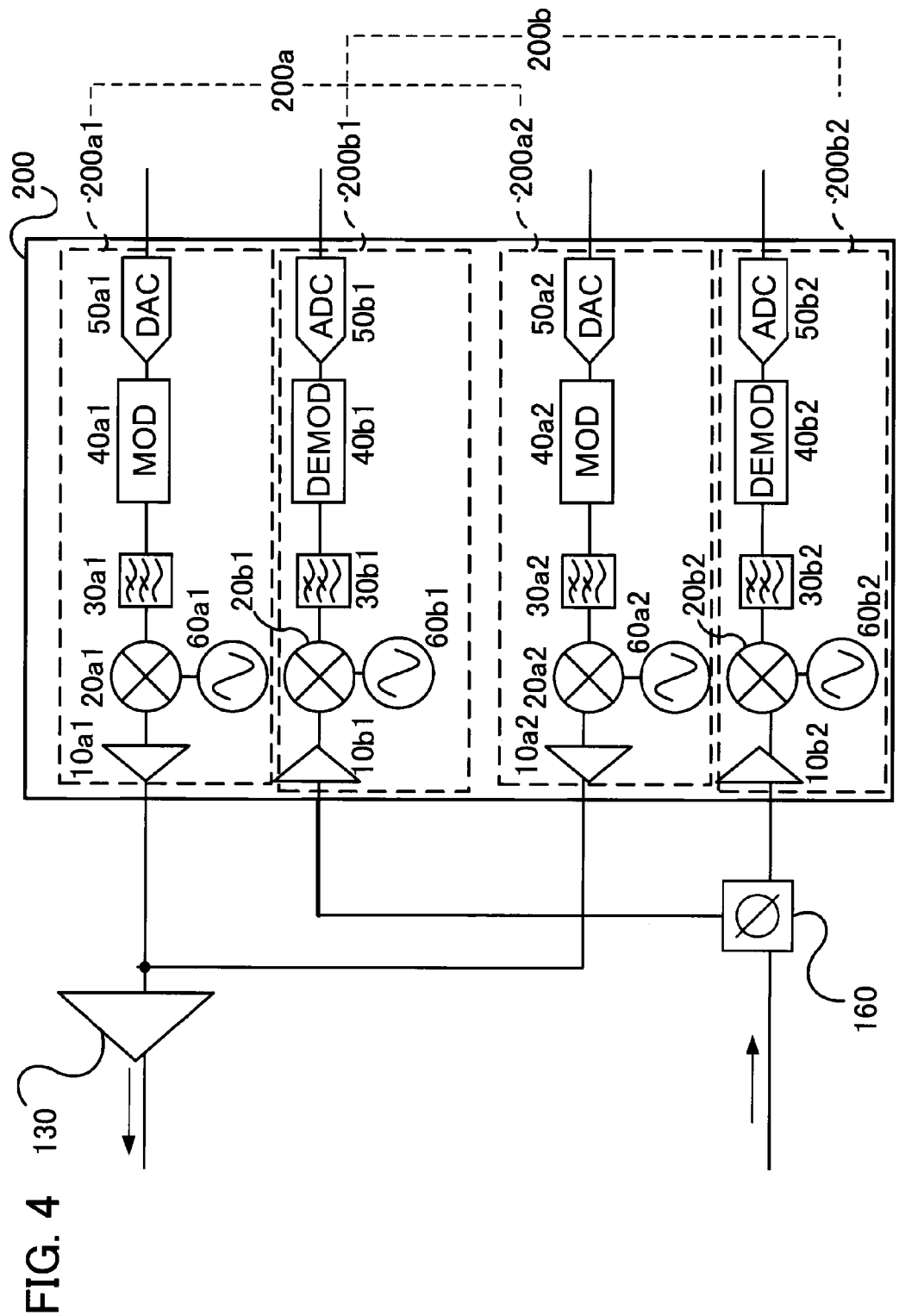
FIG. 4 is a block diagram showing a detailed configuration of a modulator-demodulator circuit of the mobile communication terminal in FIG. 3.

FIG. 4 is a diagram showing a detailed configuration of modulator-demodulator circuit 200. As shown in FIG. 4, modulator-demodulator circuit 200 has a modulation circuit 200a that has modulation circuits 200a1 and 200a2 for modulating a transmission signal, and a demodulation circuit 200b that has demodulation circuits 200b1 and 200b2 for demodulating a reception signal.

Specifically, each modulation circuit 200a (200a1,200a2) has a D/A converter (DAC) 50a (50a1,50a2), a modulator (MOD) 40a (40a1,40a2), a filter 30a (30a1,30a2), a mixer 20a (20a1,20a2), an amplifier 10a (10a1,10a2), and a synthesizer 60a (60a1,60a2). In the present embodiment, a filter 30a1 is a bandpass filter that has a passband of a 120-MHz width of frequencies from [f0] to [f0+120] MHz, and a filter 30a2 is a bandpass filter that has a passband of a 120-MHz width of frequencies from [f0+680] to [f0+800] MHz. Furthermore, a D/A converter 50a1,50a2 has an input bandwidth of 240 MHz (in the case of double oversampling). The input bandwidth of D/A converter 50a can be changed as appropriate depending on sampling rate.

With this configuration, a digital upward link transmission signal output from a baseband signal processor (not shown) that processes a baseband signal is converted to an analog transmission signal at D/A converter 50a, is quadrature-amplitude modulated (QAM) or quadrature-phase-shift-keying (QPSK) modulated at modulator 40a to pass through filter 30a, and is input to mixer 20a. A synthesizer 60a is connected to mixer 20a. A synthesizer 60a1 is an oscillator that oscillates a transmission frequency (first upward link frequency) belonging to a first upward band used for upward link communication in the first and second radio communication networks, and a synthesizer 60a2 is an oscillator that oscillates a transmission frequency (second upward link frequency) belonging to a second upward band used for upward link communication in the second radio communication network. A PLL circuit synthesizer (Phase-Locked Loop circuit synthesizer) with a VCO (Voltage Controlled Oscillator) can be used as a synthesizer. In the frequency conversion, using a direct upconversion system is preferable. In the direct upconversion system, a frequency from synthesizer 60a is made almost the same as the transmission frequency to obtain a transmission signal. According to this system, a circuit configuration is made simple, and a modulation circuit can be configured with a small area.

A first or second upward link modulated transmission signal that has been frequency converted to a first upward link frequency or a second upward link frequency at mixer 20a is amplified further at amplifier 10a and is input to radio transmitter 100A.

Thus, modulation circuit 200a1 is capable of generating a first upward link modulated transmission signal by modulating (frequency-modulating) an upward link transmission signal with a first upward link frequency belonging to the first upward band used for upward link communication in the first and second radio communication networks. Modulation circuit 200a2 is capable of generating a second upward link modulated transmission signal by modulating (frequency-modulating) an upward link transmission signal with a second upward link frequency belonging to the second upward band used for upward link communication in the second radio communication network.

Radio transmitter 100A, as shown in FIG. 3, has a power amplifier 130 that amplifies the power of an upward link modulated transmission signal output from modulation circuit 200a, a duplexer 140 that outputs the upward link modulated transmission signal output from power amplifier 130 to either a path T1 or a path T2 depending on a frequency component thereof, a transmission filter (first transmission bandpass filter) 110A arranged on path T1 and a transmission filter (second transmission bandpass filter) 110B arranged on path T2, and an adder (combiner) 150 that combines a first upward link modulated transmission signal output from transmission filter 110A and a second upward link modulated transmission signal output from transmission filter 110B. As shown in the figure, path T1 is a path through which the first upward link modulated transmission signal output from power amplifier 130 is supplied via transmission filter 110A to adder 150. Path T2 is a path through which the second upward link modulated transmission signal output from power amplifier 130 is supplied via transmission filter 110B to adder 150.

Duplexer 140 has a first bandpass filter (not shown) that passes a frequency component to the first upward band and a second bandpass filter (not shown) that passes a frequency component belonging to the second upward band. The duplexer sends out to path T1 an upward link modulated signal that has passed through the first bandpass filter, and sends out to path T2 an upward link modulated signal that has passed the second bandpass filter. An upward link modulated signal output from modulation circuit 200a, in a case in which a frequency component thereof belongs to the first upward band, passes through the first bandpass filter to be supplied to transmission bandpass filter 110A of path T1, and in a case in which a frequency component thereof belongs to the second upward band, passes through the second bandpass filter to be supplied to transmission bandpass filter 110B of path T2.

Transmission filter 110A can pass a frequency component belonging to a bandwidth of 120 MHz of frequencies from [f0] to [f0+120] MHz. That is, transmission filter 110A can pass a frequency component of a bandwidth corresponding to the first upward band used for communication in both of the first and second radio communication networks. Transmission filter 110B can pass a frequency component belonging to a bandwidth of 120 MHz of frequencies from [f0+680] to [f0+800] MHz. That is, transmission filter 110B can pass a frequency component of a bandwidth corresponding to the second upward band used for communication in the second radio communication network. Therefore, transmission filter 110A is for passing a first upward link modulated transmission signal that has been modulated with a frequency corresponding to the first upward band, and transmission filter 110B is for passing a second upward link modulated transmission signal that has been modulated with a frequency corresponding to the second upward band. Examples of transmission filter 110A, 110B include a dielectric filter, a multilayer LC filter, a surface wave filter, a BAW filter (Bulk Acoustic Wave filter) (in particular, an FBAR filter (Film Bulk Acoustic Resonator filter)), etc.

A first upward link modulated transmission signal that has passed through transmission filter 110A having a passband corresponding to [f0] to [f0+120] MHz and a second upward link modulated transmission signal that has passed through transmission filter 110B having a passband corresponding to [f0+680] to [f0+800] MHz are supplied to adder 150 and combined therein. The combined first and second upward link modulated transmission signals are simultaneously sent out from transmitting and receiving antenna 101.

Thus, because a first upward link modulated transmission signal that has been modulated with an upward link frequency belonging to the first upward band and a second upward link modulated transmission signal that has been modulated with an upward link frequency belonging to the second upward band are combined and simultaneously transmitted, it is possible to simultaneously transmit plural upward link modulated transmission signals that have been modulated with frequencies belonging to bands that are separate from each other. In other words, communication using the carrier aggregation can be performed by using mobile communication terminal 100.

On the other hand, radio receiver 100B has a reception filter (reception bandpass filter) 120 arranged between transmitting and receiving antenna 101 and demodulation circuit 200b. Examples of reception filter 120 include a dielectric filter, a multilayer LC filter, a surface wave filter, a BAW filter (in particular, an FBAR filter), etc. This reception filter 120 has a passband corresponding to a band from [f0+160] to [f0+640] MHz. That is, radio receiver 100B passes a forward link modulated reception signal that has been modulated with a frequency belonging to the first forward band [f0+160] to [f0+400] MHz) and the second forward band [f0+400] to [f0+640] MHz). Therefore, a forward link modulated reception signal that has been modulated with a frequency belonging to the first forward band for communication in the first radio communication network and a forward link modulated reception signal that has been modulated with a frequency corresponding to the first forward band and second forward band for communication in the second radio communication network are supplied via reception filter 120 to demodulation circuit 200b. Provided to the downstream of reception filter 120 and to the upstream of modulation circuit 200b is a duplexer 160. Accordingly, the first forward link modulated reception signal is supplied to modulation circuit 200b1, and the second forward link modulated reception signal is supplied to modulation circuit 200b2.

Figure 2:
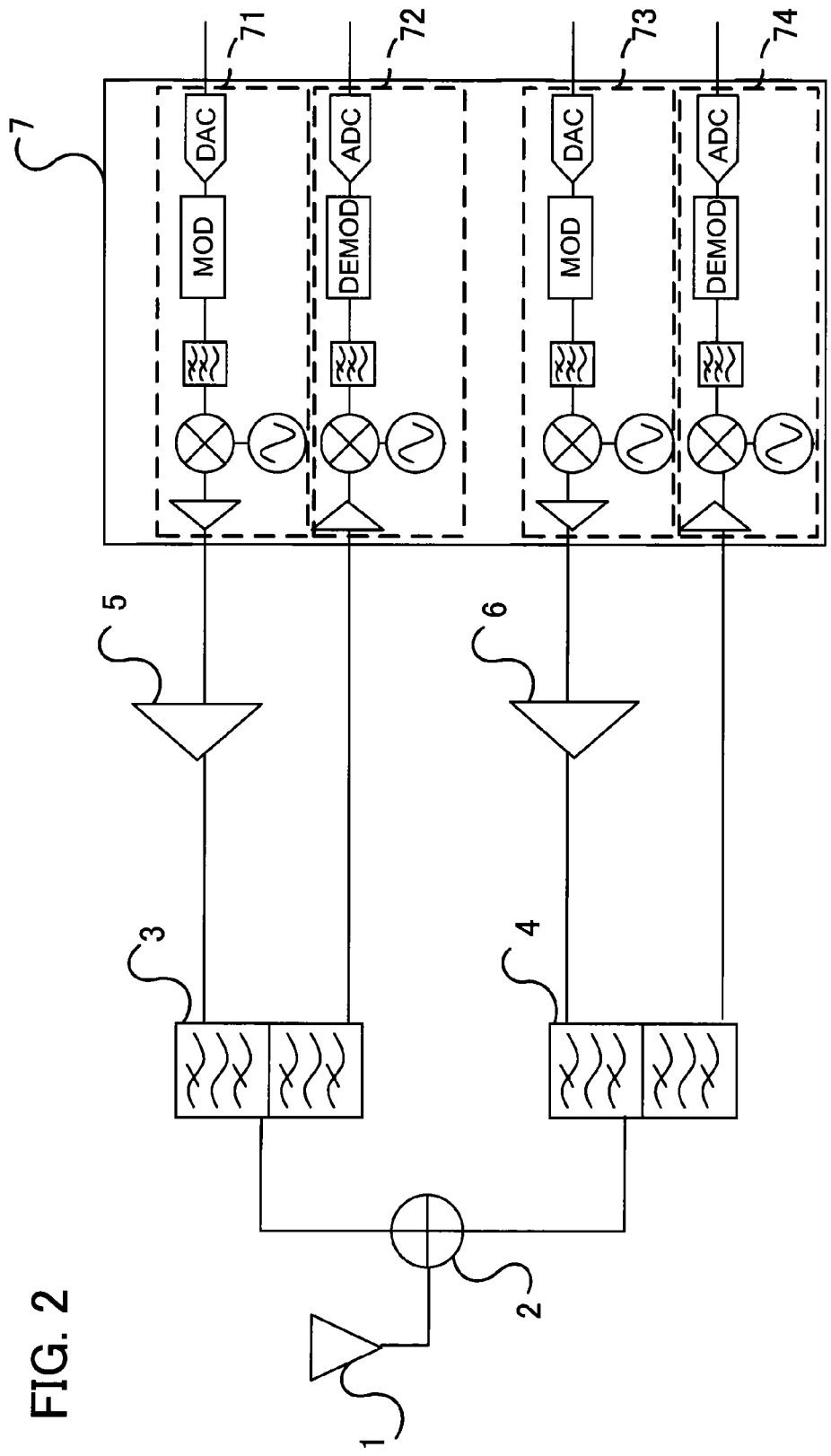
FIG. 2 is a block diagram showing a configuration of a radio station.

Radio receiver 100B of the present embodiment is configured so that a single reception filter is provided in common for the first and second radio communication networks. Therefore, the circuit area is reduced in comparison with a mobile station shown in FIG. 2 and a mobile station described in Patent Document 1. Furthermore, because reception filter 120 can process both a first forward link modulated reception signal that has been modulated with a forward link frequency belonging to the first forward band and a second forward link modulated reception signal that has been modulated with a forward link frequency belonging to the second forward band, a large amount of data can be received at high speeds in carrier aggregation in which plural forward link modulated reception signals that have been modulated with frequencies belonging to contiguous bands are simultaneously received.

In FIG. 4, each demodulation circuit 200b (200b1, 200b2) has an amplifier 10b (10b1,10b2), a mixer 20b (20b1,20b2), a filter 30b (30b1,30b2), a demodulator (DEMOD) 40b (40b1, 40b2), an A/D converter (ADC) 50b (50b1,50b2), and a synthesizer 60b (60b1,60b2). In the present embodiment, a filter 30b1 is a bandpass filter that has a passband of a 240-MHz width of frequencies from [f0+160] to [f0+400] MHz, and a filter 30b2 is a bandpass filter that has a passband of a 240-MHz width of frequencies from [f0+400] to [f0+640] MHz. Each A/D converter 50b1,50b2 has an input bandwidth of 480 MHz (in the case of double oversampling). The input bandwidth of A/D converter 50b can be changed as appropriate depending on a sampling rate.

With this configuration, a first or second forward link modulated reception signal output from radio receiver 100B is input to amplifier 10b, and is amplified for input to mixer 20b. Synthesizer 60b is connected to mixer 20b. Synthesizer 60b1 is an oscillator that oscillates a reception frequency (first forward link frequency) belonging to the first forward band used for forward link communication in the first and second radio communication networks. Synthesizer 60b2 is an oscillator that oscillates a reception frequency (second forward link frequency) belonging to the second forward band used for forward link communication in the second radio communication network. A first or second forward link modulated reception signal input to mixer 20b is frequency-converted to a baseband frequency. In the frequency conversion, using a direct upconversion system is preferable. In the direct upconversion, a frequency from synthesizer 60b is made almost the same as the reception frequency to directly obtain a baseband signal. The above-described PLL circuit is used as the synthesizer.

A frequency converted first or second reception signal passes through filter 30b, and is then input to demodulator 40b. A quadrature-amplitude modulated or quadrature-phase-shift-keying modulated reception signal is demodulated (quadrature-amplitude demodulated or quadrature-phase-shift-keying demodulated) at demodulator 40b, and is next converted to a digital reception signal at A/D converter 50b.

Thus, demodulation circuit 200b1 is capable of generating a first reception signal by demodulating (frequency-converting to a baseband frequency), with a first forward link frequency, a first forward link modulated reception signal modulated with a first forward link frequency belonging to the first forward band used for forward link communication in the first and second radio communication networks. Demodulation circuit 200b2 is capable of generating a second reception signal by demodulating (frequency-converting to a baseband frequency), with a second forward link frequency, a second forward link modulated reception signal modulated with a second forward link frequency belonging to the second forward band used for forward link communication in the second radio communication network.

As described in the foregoing, according to the radio communication terminal of the present embodiment, a radio communication terminal compatible with two radio communication networks, for which an upward link frequency band and a forward link frequency band for one of the two radio communication networks differ from an upward link frequency band and a forward link frequency band for the other, and capable of simultaneously transmitting plural upward link modulated transmission signals and capable of simultaneously receiving plural forward modulated reception signals, can be provided while suppressing the increase in the circuit area of a radio communication unit.

The present invention is not limited to the above-described embodiment and can be modified in various ways.

For example, in the modulator-demodulator circuit 200 shown in FIG. 4, description was given of a case in which two sets of modulation circuits 200a1,200a2 and two sets of demodulation circuits 200b1,200b2 are provided, but it may be modified so that a set of a modulation circuit and a set of a demodulation circuit is provided. In this case, the circuit area can be additionally reduced.

Figure 5:
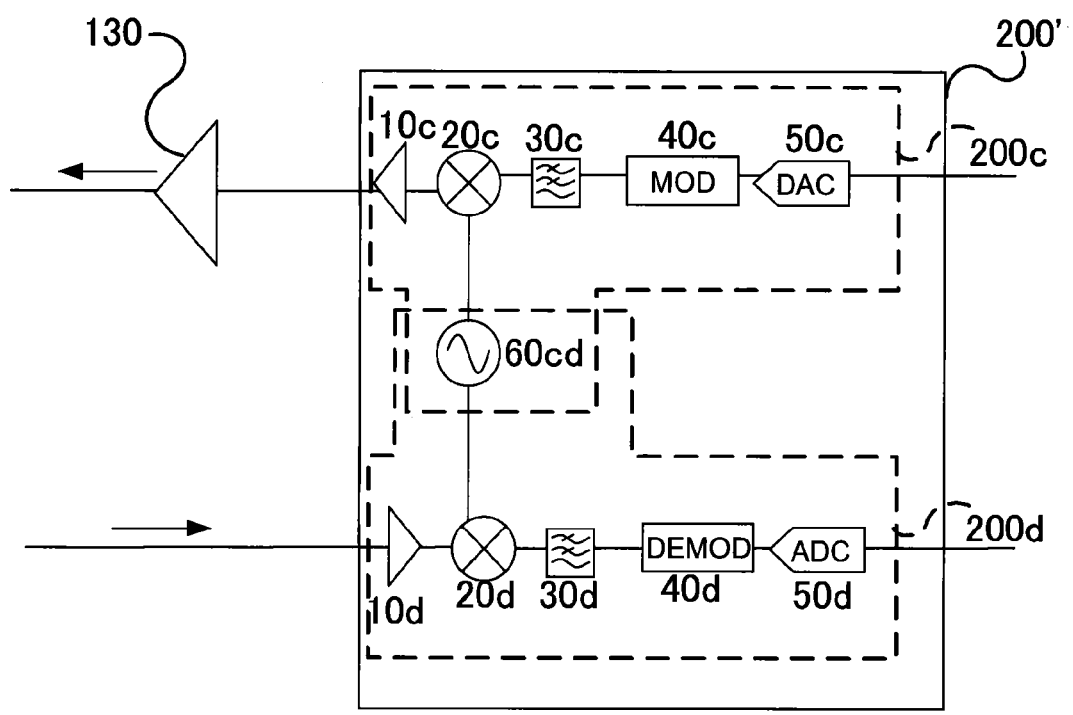
FIG. 5 is a block diagram showing a modification of the modulator-demodulator circuit.

FIG. 5 shows an example of a configuration showing a modulator-demodulator circuit that has a set of modulation circuit and a set of demodulation circuit. As shown in FIG. 5, modulator-demodulator circuit 200' has a modulation circuit 200c that has a D/A converter 50c, a modulator 40c, a filter 30c, a mixer 20c, and an amplifier 10c and a demodulation circuit 200d that has an amplifier 10d, a mixer 20d, a filter 30d, a demodulator 40d, and an A/D converter 50d. Connected to each of mixer 20c of each modulation circuit 200c and mixer 20d of demodulation circuit 200d is a synthesizer 60cd. Synthesizer 60cd belongs to both modulation circuit 200c and demodulation circuit 200d.

In this case, filter 30c is a bandpass filter that has a passband of an 800-MHz width of frequencies from [f0] to [f0+800] MHz including the first upward band ([f0] to [f0+120] MHz) and the second upward band ([f0+680] to [f0+800] MHz). D/A converter 50c has an input bandwidth of 1600 MHz (in the case of double oversampling).

Filter 30d is a bandpass filter that has a passband of a 480-MHz width of frequencies from [f0+160] to [f0+640] MHz, including the first forward band ([f0+160] to [f0+400] MHz) and the second forward band ([f0+400] to [f0+640] MHz). A/D converter 50d has an input bandwidth of 960 MHz (in the case of double oversampling). The input bandwidth for D/A converter 50c and A/D converter 50d can be changed as appropriate depending on a sampling rate.

Synthesizer 60cd supplies a center frequency of a passband for filter 30c to mixer 20c of modulation circuit 200c, and supplies a center frequency of a passband for filter 30d to mixer 20d of demodulation circuit 200d. In the bandwidth partitioning of the present embodiment, because the center frequency of a passband for filter 30c is [f0]+[f0+400] MHz and the center frequency of a passband for filter 30d is [f0]+[f0+400] MHz, they are the same. Therefore, single synthesizer 60cd is used in common instead of providing separate synthesizers for the modulation circuit and the demodulation circuit. The above PLL circuit can be used as a synthesizer.

With this configuration, a digital upward link transmission signal output from a baseband signal processor (not shown) that passes a baseband signal is converted to an analog transmission signal at D/A converter 50c. This analog transmission signal is quadrature-amplitude modulated or quadrature-phase-shift-keying modulated at modulator 40c to pass through filter 30c, and is input to mixer 20c. The signal is then frequency-converted with a frequency supplied from synthesizer 60cd and supplied to power amplifier 130 of radio transmitter 100A after being amplified at amplifier 10c.

On the other hand, the first or second forward link modulated reception signal output from radio receiver 100B is input to amplifier 10d, is amplified, and is then input to mixer 20d. The signal is then frequency-converted to a baseband frequency, by a frequency supplied from synthesizer 60cd, and is supplied to filter 30d. A reception signal that has passed through filter 30d is demodulated (quadrature-amplitude demodulated or quadrature-phase-shift-keying demodulated) at demodulator 40*d* and is converted to an analog reception signal at A/D converter 50*b*.

In the above embodiment, an example of providing, as a modulator-demodulator circuit, two sets of modulation circuits and two sets of demodulation circuits is shown (FIG. 4). In a modification shown in FIG. 5, an example of providing, as a modulator-demodulator circuit, a set of modulation circuit and a set of demodulation circuit is shown. However, the present invention is not limited to these embodiments. Depending on the number of carrier signals to be modulated or demodulated, three or more sets of modulation circuits and three or more sets of demodulation circuits may be provided. Furthermore, a number of synthesizers based on the number of modulation circuits and a number of synthesizers based on the number of demodulation circuits may be provided.

Additionally, in the above embodiment and in the modification shown in FIG. 5, D/A converter 50*a*,50*c* provided to the upstream of modulator 40*a*,40*c* is shown in the figure, but conversely, D/A converter 50*a*,50*c* may be provided to the downstream of modulator 40*a*,40*c*. Similarly, in the above embodiment and in the modification shown in FIG. 5, A/D converter 50*b*,50*d* provided to the downstream of demodulator 40*b*,40*d* is shown in the figure, but conversely, A/D converter 50*b*,50*d* may be provided to the upstream of demodulator 40*b*,40*d*. In this case, because quadrature-amplitude modulation (or demodulation) or quadrature-phase-shift-keying modulation (or demodulation) is performed on a digital signal, a circuit configuration can be made relatively simple compared to a case in which an analog signal is modulated (or demodulated). Therefore, a circuit area can be reduced.

In the above embodiment, description was given of a case in which the bandwidth for the first radio communication network is a 400-MHz width and in which the bandwidth for the second radio communication network is an 800-MHz width, but various bandwidths can be used depending on a bandwidth allocated in common internationally and on a bandwidth allocated for each country and region. The bandwidth partitioning within the allocated bandwidth is not limited to the above-described embodiment.

DESCRIPTION OF REFERENCE NUMERALS

10*a* (10*a*1,10*a*2),10*b* (10*b*1,10*b*2),10*c*,10*d* . . . amplifier
20*a* (20*a*1,20*a*2),20*b* (20*b*1,20*b*2),20*c*,20*d* . . . mixer
30*a* (30*a*1,30*a*2),30*b* (30*b*1,30*b*2),30*c*,30*d* . . . filter
40*a* (40*a*1,40*a*2),40*c* . . . modulator
40*b* (40*b*1,40*b*2),40*d* . . . demodulator
50*a* (50*a*1,50*a*2),50*c* . . . D/A converter
50*b* (50*b*1,50*b*2),50*d* . . . A/D converter
60*a* (60*a*1,60*a*2),60*b* (60*b*1,60*b*2),60*cd* . . . synthesizer
100 . . . mobile communication terminal (radio communication terminal)
100A . . . radio transmitter
100B . . . radio receiver
101 . . . transmitting and receiving antenna (transmitter antenna, receiver antenna)
102 . . . duplexer
110A . . . transmission filter (first transmission bandpass filter)
110B . . . transmission filter (second transmission bandpass filter)
120B . . . reception filter (reception bandpass filter)
130 . . . power amplifier
140,160 . . . duplexer
150 . . . adder (combiner)
200,200' . . . modulator-demodulator circuit
200*a* (200*a*1,200*a*2),200*c* . . . modulation circuit (modulation unit)
200*b* (200*b*1,200*b*2),200*d* . . . demodulation circuit (demodulation unit)
T1,T2,R . . . path

The invention claimed is:

1. A radio communication terminal comprising:
a modulation unit for generating a first upward link modulated transmission signal transmitted by a first upward link frequency belonging to a first upward band used for upward link communication in both of a first radio communication network and a second radio communication network, and for generating a second upward link modulated transmission signal transmitted by a second upward link frequency belonging to a second upward band used for upward link communication in said second radio communication network;
a first transmission bandpass filter that passes a frequency component belonging to said first upward band;
a second transmission bandpass filter that passes a frequency component belonging to said second upward band;
a duplexer that passes a frequency component belonging to said first upward band so that said first upward link modulated transmission signal passes through said first transmission bandpass filter, and that passes a frequency component belonging to said second upward band so that said second upward link modulated transmission signal passes through said second transmission bandpass filter;
a combiner that combines said first upward link modulated transmission signal that has passed through said first transmission bandpass filter and said second upward link modulated transmission signal that has passed through said second transmission bandpass filter;
a transmitter antenna that simultaneously transmits said first upward link modulated transmission signal and said second upward link modulated transmission signal;
a receiver antenna that simultaneously receives a first forward link modulated reception signal modulated by a first forward link frequency belonging to a first forward band used in forward link communication in both the first radio communication network and the second radio communication network and a second forward link modulated reception signal modulated by a second forward link frequency belonging to a second forward band used for forward link communication in said second radio communication network, said first forward band and said second forward band being contiguous;
a reception bandpass filter that passes a frequency component belonging to said first forward band and a frequency component belonging to said second forward band from the receiver antenna; and
a demodulation unit for generating a first reception signal by demodulating said first forward link modulated reception signal that has passed through said reception bandpass filter and for generating a second reception signal by demodulating said second forward link modulated reception signal that has passed through said reception bandpass filter.

2. A radio communication terminal comprising:
circuitry configured to generate a first upward link modulated transmission signal transmitted by a first upward link frequency belonging to a first upward band used for upward link communication in both of a first radio communication network and a second radio communication network, and generate a second upward link modulated transmission signal transmitted by a second upward link frequency belonging to a second upward band used for upward link communication in said second radio communication network;

a first transmission bandpass filter configured to pass a frequency component belonging to said first upward band;

a second transmission bandpass filter configured to pass a frequency component belonging to said second upward band;

a duplexer configured to pass a frequency component belonging to said first upward band so that said first upward link modulated transmission signal passes through said first transmission bandpass filter, and pass a frequency component belonging to said second upward band so that said second upward link modulated transmission signal passes through said second transmission bandpass filter;

a combiner configured to combine said first upward link modulated transmission signal that has passed through said first transmission bandpass filter and said second upward link modulated transmission signal that has passed through said second transmission bandpass filter;

a transmitter antenna configured to simultaneously transmit said first upward link modulated transmission signal and said second upward link modulated transmission signal;

a receiver antenna configured to simultaneously receive a first forward link modulated reception signal modulated by a first forward link frequency belonging to a first forward band used in forward link communication in both the first radio communication network and the second radio communication network and a second forward link modulated reception signal modulated by a second forward link frequency belonging to a second forward band used for forward link communication in said second radio communication network, said first forward band and said second forward band being contiguous; and a reception bandpass filter configured to pass a frequency component belonging to said first forward band and a frequency component belonging to said second forward band from the receiver antenna, wherein the circuitry is further configured to generate a first reception signal by demodulating said first forward link modulated reception signal that has passed through said reception bandpass filter and generate a second reception signal by demodulating said second forward link modulated reception signal that has passed through said reception bandpass filter.

* * * * *

UNITED STATES PATENT AND TRADEMARK OFFICE
CERTIFICATE OF CORRECTION

PATENT NO. : 8,879,499 B2  
APPLICATION NO. : 13/512397  
DATED : *November 4, 2014  
INVENTOR(S) : Shinya Oka et al.

Page 1 of 1

It is certified that error appears in the above-identified patent and that said Letters Patent is hereby corrected as shown below:

On the title page, Item (73), the Assignee's Information is incorrect. Item (73) should read:

--(73) Assignee: NTT DOCOMO, INC., Tokyo (JP)--

Signed and Sealed this
Seventeenth Day of February, 2015

Michelle K. Lee
*Deputy Director of the United States Patent and Trademark Office*